United States Patent [19]

Hall

[11] Patent Number: 4,729,440

[45] Date of Patent: * Mar. 8, 1988

[54] TRANSISTION LAYER POLYCRYSTALLINE DIAMOND BEARING

[75] Inventor: David R. Hall, Provo, Utah

[73] Assignee: Smith International, Inc., Newport Beach, Calif.

[*] Notice: The portion of the term of this patent subsequent to Aug. 5, 2003 has been disclaimed.

[21] Appl. No.: 864,683

[22] Filed: May 19, 1986

Related U.S. Application Data

[63] Continuation-in-part of Ser. No. 728,177, Apr. 29, 1985, Pat. No. 4,604,106, which is a continuation-in-part of Ser. No. 600,399, Apr. 16, 1984, Pat. No. 4,525,178.

[51] Int. Cl.$^4$ .................. E21B 4/02; E21B 10/22
[52] U.S. Cl. ...................... 175/107; 51/293; 175/329; 175/371; 384/95; 384/907.1
[58] Field of Search ............... 175/107, 371; 384/907, 384/907.1, 303, 282–285, 912, 95; 51/293, 295, 297, 309

[56] References Cited

U.S. PATENT DOCUMENTS

| | | | |
|---|---|---|---|
| T102,901 | 4/1983 | Offenbacher | 384/907 X |
| 3,745,623 | 7/1973 | Wentorf | 29/95 B |
| 4,029,368 | 6/1977 | Tschirky | 175/371 |
| 4,190,301 | 2/1980 | Lachonius et al. | 175/330 X |
| 4,215,999 | 8/1980 | Phaal | 51/295 |
| 4,229,186 | 10/1980 | Wilson | 51/297 |
| 4,252,102 | 2/1981 | Phaal | 125/39 |
| 4,255,165 | 3/1981 | Dennis | 51/309 |
| 4,260,203 | 4/1981 | Garner | 384/96 |
| 4,303,442 | 12/1981 | Hara | 75/243 |
| 4,345,798 | 8/1982 | Cortes | 384/907.1 |
| 4,370,149 | 1/1983 | Hara | 51/309 |
| 4,410,054 | 10/1983 | Nagel et al. | 175/107 |
| 4,411,672 | 10/1983 | Ishizuka | 51/309 |
| 4,525,178 | 6/1985 | Hall | 51/309 |
| 4,560,014 | 12/1985 | Geczy | 175/107 |
| 4,604,106 | 8/1986 | Hall | 51/293 |

FOREIGN PATENT DOCUMENTS 2433130 8/1978 France .

Primary Examiner—James A. Leppink
Assistant Examiner—Hoang C. Dang
Attorney, Agent, or Firm—Willian Brinks Olds Hofer Gilson & Lione Ltd.

[57] ABSTRACT

An earth boring apparatus is disclosed having bearing members comprised of transition layer polycrystalline diamond. The transition layer polycrystalline diamond bearings include a polycrystalline diamond layer interfaced with a composite transition layer comprising a mixture of diamond crystals and precemented carbide pieces subjected to high temperature/high pressure conditions so as to form polycrystalline diamond material bonded to the precemented carbide pieces. The polycrystalline diamond layer acts as the bearing surface. The transition layer bearings are preferably supported by a cemented tungsten carbide substrate interfaced with the transition layer.

34 Claims, 18 Drawing Figures

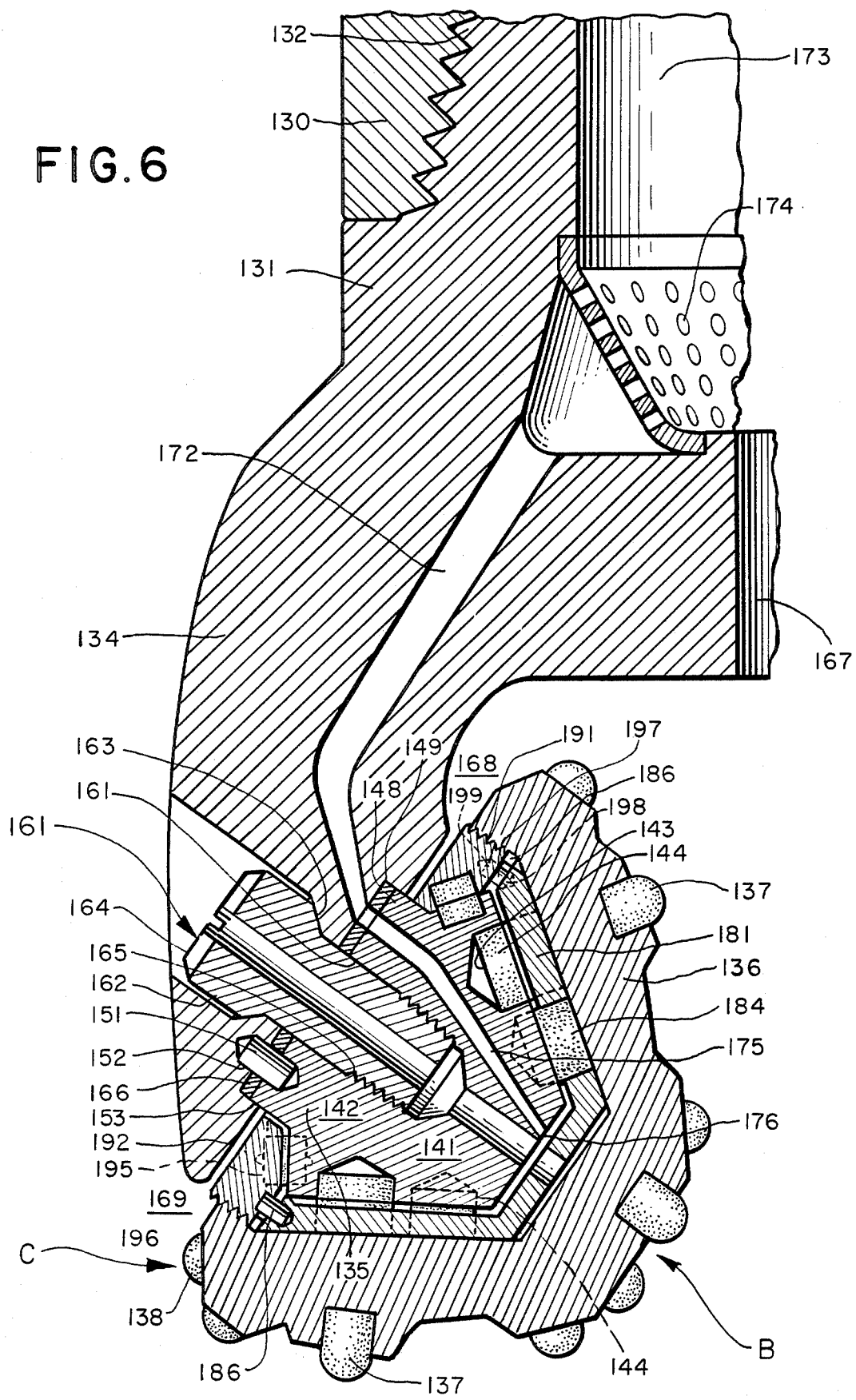

TRANSISTION LAYER POLYCRYSTALLINE DIAMOND BEARING

This application is a continuation-in-part of application Ser. No. 728,177 filed Apr. 29, 1985 by David R. Hall, now U.S. Pat. No. 4,604,106, which is in turn a continuation-in-part of application Ser. No. 06/600,399, now U.S. Pat. No. 4,525,178, filed Apr. 16, 1984 by David R. Hall, both of which are incorporated herein by reference.

BACKGROUND OF THE INVENTION

This invention relates generally to bearings. More particularly, the invention relates to bodies used for bearings, wherein the bodies comprise polycrystalline diamond and cemented metal carbide pressed at ultra high pressure and temperature. The bearings described herein are particularly useful in earth boring and like operations.

Earth boring applications typically occur in a very hostile environment. For example, harsh chemicals and extreme temperatures are common in geothermal well drilling. Furthermore, drill bits are subjected to extremely high impact forces, particularly in transitions between hard and soft rock formations. And in virtually all applications higher loads on the drill bit are desirable to achieve faster penetration rates, thereby decreasing drilling time and cost. The bearings in drilling tools are most vulnerable to the hostile drilling environment. Accordingly, much effort has recently been devoted to improving wear and impact resistance, and load capacity of materials suitable for use as a bearing.

Polycrystalline diamond (PCD) has been suggested for use as a bearing in earth boring applications. See, e.g., U.S. Pat. Nos. 4,260,203 and 4,029,368. Excessive fracturing and spalling of the PCD, on macro and microscopic scales, however, has severely limited the use of PCD as a bearing.

Because diamond has a high modulus of elasticity, PCD has relative low impact resistance. The low impact resistance of PCD, which has been identified as at least one cause of the fracturing and spalling of PCD, is particularly disadvantageous in bearing applications where the PCD is subject to high impact forces and where a high load bearing capacity is required, such as in earth boring applications.

In an attempt to circumvent the problems associated with brittle PCD, PCD products originally included a precemented carbide substrate, yielding what is termed a "composite compact". The presence of a substrate, however, causes additional problems. Because the precemented carbide substrate has a higher coefficient of thermal expansion than PCD, stresses are created when the PCD composite compact cools from the 1,300° to 2,000° C. temperatures at which the composite is made; the carbide substrate shrinks more than the diamond, and because the diamond layer is less elastic than the carbide substrate, these stresses often cause cracking of the diamond layer, either during cooling or during use.

Another disadvantage to having a substrate directly bonded to the PCD is that some metals will not bond to PCD. For example, steel, which has a low modulus of elasticity and would be preferred in high impact applications such as earth boring, cannot presently be bonded to PCD because ferrous materials (such as steel) catalyze the graphitization of PCD and are therefore chemically incompatible.

Yet another disadvantage of having a substrate directly bonded to the PCD is that the thickness of the PCD is limited. The limitation exists mainly because of a phenomenon called "bridging". Bridging occurs when a fine powder is pressed from multiple directions, and individual particles in the powder stack up and form arches or "bridges" so that the center of the powder does not receive the full amount of pressure. When a 1 micron diamond powder is used to make a PCD compact with is more than about 0.06 inches thick, for example, the PCD toward the center of the piece is usually not as well formed as the exterior. This condition causes cracking and chipping of the diamond layer.

Accordingly, there is a need for a PCD bearing material that is wear resistant, impact resistant, and has a high load capacity.

SUMMARY OF THE INVENTION

The present invention in an earth boring apparatus having a pair of rotatable members adapted for relative movement, between which is a pair of complementary transition layer friction bearings mounted in bearing relationship. In the preferred embodiments of this invention transition layer PCD bearings are used in either a roller cone rock bit or a fluid motor assembly, both of which are subject to the hostile down-hole drilling environment.

The transition layer PCD friction bearing of this invention is a composite body comprising polycrystalline diamond and cemented carbide. Each friction bearing comprises a polycrystalline diamond layer and a transition layer. The polycrystalline diamond layer has a friction surface for slidably contacting a complementary bearing, and joins at an interface with a transition layer which supports the polycrystalline diamond layer. The polycrystalline diamond layer comprises diamond crystals which are pressed under sufficient heat and pressure to cause adjacent diamond crystals to bond together. The transition layer comprises a mixture of polycrystalline diamond pieces and precemented tungsten carbide pieces which, together with the polycrystalline diamond layer, are pressed under sufficient heat and pressure to cause the diamond crystals to bond to adjacent diamond crystals and adjacent precemented carbide pieces. The polycrystalline diamond and precemented carbide pieces are thus interspersed in one another, forming a composite material, with either polycrystalline diamond or precemented carbide providing a matrix in which the other material is dispersed.

In accordance with another embodiment of the transition layer PCD bearing, the volume percent of PCD is not uniform through each of the two layers. Rather, in the first layer, the volume percent of PCD is highest when measured at the exposed friction surface (most preferably 100%) and then gradually decreases toward the interface with the transition layer. Likewise, in the second layer, the volume percent of PCD is highest at the interface with the PCD layer and decreases when moving away from the interface. In the most preferred form of this embodiment, the boundary between the two layers is nondistinct. That is, the volume percent of diamond together with the way that it changes through each layer is selected so that the volume percent of diamond in the PCD layer at the interface is only slightly greater than or even equal to the volume percent of diamond in the transition layer at the interface.

Consequently, this embodiment can alternatively be described as having only one polycrystalline layer with a decreasing volume percent of diamond in the direction away from the exposed friction surface. Alternatively, this same embodiment could be described as having several thin layers with the exposed layer having the highest volume percent of diamond and the other layers each decreasing slightly in diamond concentration.

In accordance with still another embodiment of the present invention, the composite body comprises two distinct transition layers. In this embodiment, each layer has a relatively uniform volume percent of diamond with the layer adjacent to the exposed layer having the highest percent of diamond.

In each of the preferred embodiments of the present invention the composite body also includes a substrate. Such a substrate can comprise cemented carbide, steel, or other metallic, ceramic, or cermet materials. In one preferred embodiment, the substrate consists of cemented tungsten carbide. In another preferred embodiment, the substrate consists of steel or another ferrous alloy and the composite body further comprises a barrier layer of cemented carbide disposed between the substrate and the closest layer including PCD.

The transition layer PCD bearing described above is used in an apparatus where wear and impact resistance of bearings is necessary. Although the transition layer PCD bearing of this invention can be used in virtually any application where bearings are used, the advantages of the bearing are most apparent in earth boring operations where the bearing is subject to high impact forces and high loads. The bearing may, for example, be incorporated in a roller cone rock bit or a fluid motor assembly.

In the roller cone rock bit embodiment of this invention the rock bit has a main bit body, one end of the main bit body having means for connecting the bit to a drill string, the other end having means for mounting at least one roller cone. When the drill string is rotated, the roller cone is made to rotate relative to the bit body around an axis transverse to the rotational axis of the bit. A bearing system between the roller cone and the bit body mounted in bearing relationship supports the cone on the bit body and provides a wear surface. This bearing system comprises a pair of complementary friction bearing members, one member mounted on the bit body, the other member mounted on the inside of the roller cone. The bearing members are made of transition layer PCD bodies as described above.

In another embodiment of the present invention, the earth boring apparatus is a down hole fluid motor assembly. Such a fluid motor assembly connects at one end to the lower end of a drill string and at the other end to a drill bit which is driven by the drill string. A fluid motor assembly has a tubular housing and a rotary shaft that is supported therein. The rotary shaft supports and drives a drill bit. A motor located in the housing is driven by the flow of drilling fluid. A bearing system in the housing supports the rotary shaft. This bearing system comprises at least one pair of complementary friction bearing members, one member mounted on the inside of the housing, the other member mounted on the rotary shaft. The bearing members, having high impact resistance, and high load capacity, are made of transition layer PCD bodies, as described above.

The transition layer PCD bearing has many advantages over standard PCD bearings. For example, because the transition layer of this invention has a mixture of PCD and cemented carbide it also has an intermediate thermal coefficient of expansion that is between PCD and cemented carbide. The relatively small difference in the coefficients of thermal expansion between these transition layers results in less stress. Accordingly, less cracking and spalling of the PCD occurs.

An additional advantage of transition layer PCD bearings is that the presence of the cemented carbide pieces in the transition layer reduce problems caused by bridging. Because the precemented pieces of carbide do not compress appreciably, pressure distribution in the pressing cell is improved and the transition layer PCD can be thicker without attendant problems associated with bridging.

In short, brittleness of PCD, and stresses and bridging in composite compacts, are primarily responsible for cracking of PCD. The addition of a transition layer between the PCD and carbide substrate reduces these problems, and accordingly reduces the incidence of cracking and spalling. In addition, the load bearing capacity of the earth boring apparatus of this invention is greatly increased by using the transition layer bearings.

BRIEF DESCRIPTION OF THE DRAWINGS

FIG. 6 is a sectional view illustrating the preferred embodiment of the rock bit of the present invention.

DETAILED DESCRIPTION OF THE DRAWINGS

The following detailed description of the drawings describes the transition layer PCD bearings, and the structure of the roller cone rock bit and the fluid motor assembly in which the transition layer PCD bearings are used.

As used in the following disclosure and claims, the terms "polycrystalline diamond" and its acronym "PCD" are intended to refer to the type of material which is made by subjecting individual diamond crystals to ultra high pressure and temperature such that intercrystalline bonding occurs. Generally, a catalyst/binder material is used to ensure adequate intercrystalline bonding. This material is also often referred to in the art as "sintered diamond".

Also, in the following disclosure and claims the term "precemented carbide" is intended to refer to the type of material resulting when grains of a carbide of one of the group IVB, VB, or VIB metals are pressed and heated (in the presence of a binder such as cobalt, nickel, or iron as well as various alloys thereof) to produce solid, integral pieces. The most common and readily available form of precemented carbide is tungsten carbide containing a cobalt binder.

Also, as used herein, "volume percent polycrystalline diamond" means volume percent of polycrystalline diamond including catalyst/binder remaining in the PCD after pressing.

Transition Layer PCD Bearings

Figure 1:
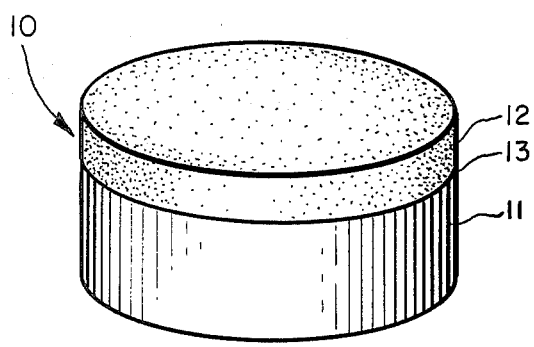
FIG. 1 illustrates an example of a prior art composite compact.

FIG. 1 illustrates a prior art composite compact 10 which includes a layer 12 of polycrystalline diamond supported by a cemented carbide backing or substrate 11. See for example U.S. Pat. No. 3,745,623. The diamond layer 12 is comprised of individual diamond crystals that have been subjected to sufficient heat and pressure to cause intercrystalline bonding. The cemented carbide backing 11 is intimately bonded to the diamond layer 12 at the interface 13. There is a strong chemical bond formed during the press cycle at the interface 13 between the two layers 11 and 12. Because the cemented carbide backing 11 shrinks more upon cooling than the diamond layer 12, residual stresses are set up between the two layers which can cause premature cracking in the diamond layer. Such PCD bearings are the type used, for example, in U.S. Pat. No. 4,410,054 to Nagel (directed to a fluid motor assembly), and U.S. Pat. No. 4,260,203 to Gardner (directed to a rotary rock bit).

Figure 2:
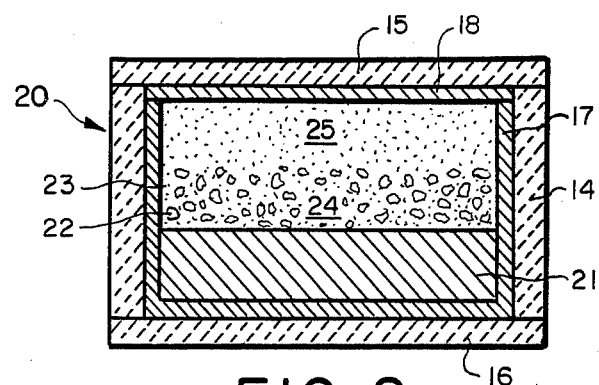
FIG. 2 is a cross-sectional view of a sample cell used to fabricate an embodiment of the composite polycrystalline diamond bearing of the present invention.

FIG. 2 shows a cross-section of a pressing unit 20 that may be employed to make the composite polycrystalline diamond body of the present invention. The pressing unit 20 is cylindrical in shape and is designed to fit within the central cavity of an ultra high pressure and temperature cell such that described in U.S. Pat. No. 3,913,280 (for use in cubic presses) or U.S. Pat. No. 3,745,623 (for use in "belt" type presses). The pressing unit 20 includes a hollow tube 14 with discs 15 and 16 located at the top and bottom of the tube 14. The tube 14 and discs 15 and 16 function as a plastic pressure transmitting medium and preferably consist of pressed NaCl, although talc or hexagonal boron nitride may also be used.

Within the tube 14 is a protective metal enclosure 17 which is also cylindrical in shape and closed at the bottom end. This enclosure 17 is preferably made from molybdenum because of its high melting temperature, but other metals such as zirconium or tantalum also work well. A disc 18, usually comprising the same metal as the enclosure 17, is placed as a lid on the top of the enclosure 17.

A substrate 21 is place in the bottom of the enclosure 17. This substrate comprises cemented tungsten carbide with a cobalt binder in this preferred embodiment. Substrates with this composition have proven to be chemically compatible with many of the catalyst/binder systems utilized to form polycrystalline diamond. Also, substrates comprising other metallic, ceramic, or cement composition may be employed. For example, steel or another ferrous alloy may be used. However when using steel or any other material which is chemically reactive or otherwise incompatible with the system used to produce the PCD, it is desirable to include an additional layer to serve as a barrier between the substrate and the diamond. A layer consisting of grains of precemented carbide has been successfully used in this capacity. This substrate 21 may serve a supporting function for the compact produced and may be used for attaching the compact to a bearing support structure.

Adjacent to the substrate 21 is a transition layer 24 comprising a mixture of pieces of precemented carbide 22 and diamond crystals 23 together with a catalyst/binder material for the formation of polycrystalline diamond. This mixture may be produced by ball milling the precemented carbide pieces 22 with the diamond crystals 23 and a suitable catalyst/binder material. The mixture can then be poured into the metal enclosure 17 on top of the substrate 21. In this preferred embodiment, the carbide pieces 22 occupy approximately 60 volume percent of the transition layer after pressing.

Each piece of precemented carbide 22 comprises cemented tungsten carbide with a cobalt binder. At present, for reasons of chemical compatibility, it is preferable that the pieces of precemented carbide 22 have the same composition including the binder phase as the substrate 21. However, it may alternatively be desirable to vary the binder content in the precemented carbide pieces to produce different properties (e.g. the modulus of elasticity) of the pieces 22 than those of the substrate 21. Likewise, in alternative embodiments with more than one transition layer, the binder content or tungsten carbide grain size within the cemented carbide pieces could be varied from layer to layer to accomplish this same result.

The size and shape of the pieces of precemented carbide 22 can be varied to achieve different results. The shape can be regular or irregular. Because the most economical source of precemented carbide pieces is in the form of crushed grit, or flame-sprayed presintered grit, irregular shaped pieces are presently preferred. For convenience and clarity in the drawings, the size of the pieces of carbide 22 have been greatly exaggerated in this and other drawings over that which is preferable. It is preferable to use carbide pieces that would be too small to be seen without magnification. In particular, a grit size of minus 325 U.S. mesh is presently preferred.

In addition, it is deemed preferable to use carbide pieces that are significatly larger than the diamond crystals in order to lessen the degree to which the carbide pieces interfere with the formation of diamond to diamond bonding.

The size of the diamond crystals 23 used can also be varied by well known means to suit the needs of particular applications. In this preferred embodiment, a mixture of diamonds from 1 to 100 microns is used, most preferably 4 to 12 microns. Various catalyst/binder materials for the formation of PCD are well known in the art. In this preferred embodiment a catalyst/binder is mixed with the diamond crystals which comprises cobalt powder and is present in a 1 to 10 volumetric ratio with the diamond cobal mixture.

Alternatively, the catalyst for bonding the crystals together in this layer 24 may be derived entirely from the binder present in the precemented carbide pieces. In other words, the cobalt or other binder in the precemented carbide pieces 22 may extrude out of the precemented pieces during the press cycle in sufficient quantity to function as the catalyst/binder for the diamond crystals 23.

Adjacent to the mixture just described, is another layer 25 comprising a quantity of diamond crystals together with a suitable catalyst/binder material, preferably the same catalyst/binder material as in the transition layer. Again, the catalyst binder in this layer 25 may alternatively be either partially or entirely provided from the binder which migrates from the precemented carbide pieces 22. This layer 25 can be simply poured into the metal enclosure 17 on top of the transition layer 24. This layer 25 will include the friction surface of the bearing produced.

In this embodiment, the diamond crystals are present in a mixture of sizes equivalent to that in the transition layer. However, because this layer will include the working surface of the ultimate compact, it may be desirable to vary the particle sizes of the diamond to suit a particular application. For example, it is preferable to use fine diamond crystals, such as 0 to 5 microns, to improve the finish of the exposed surface for bearing applications. It may further be desirable to include two or more layers of diamond crystals with the top layer comprising the smallest crystals.

The pressing unit, prepared as outlined above, is then subjected to high temperature/high pressure conditions well known in the art and described in more detail in this inventor's copending application Ser. No. 728,177, now issued as U.S. Pat. No. 4,604,106.

Figure 3:
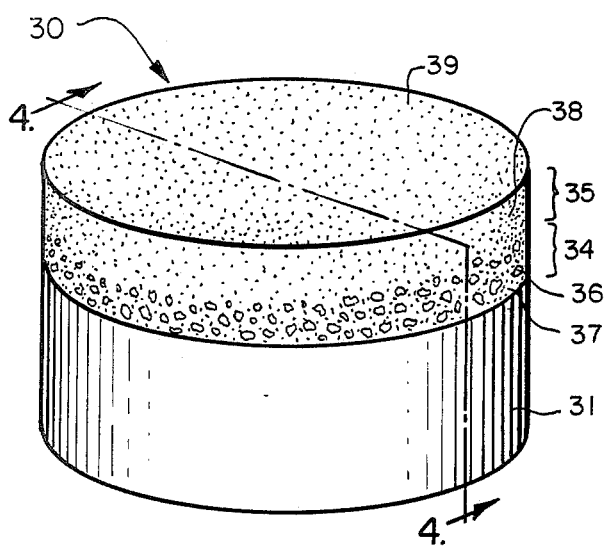
FIG. 3 is a perspective view of a composite compact made according to an embodiment of the present invention.

FIG. 3 is a perspective view of a composite body 30 made according to the present invention. The body 30, which is suitable for bearing applications requiring extreme wear resistance and impact resistance, includes a substrate 31. The substrate shown here comprises a precemented disc of cobalt bonded tungsten carbide. As mentioned above, other materials may also be used for the substrate 31. The substrate 31 is brazed to a supporting structure where it can then be used.

Directly adjacent to the substrate 31 is a transition layer 34. The transition layer 34 comprises an integrally bonded mixture of polycrystalline diamond 37 and precemented carbide pieces 36 (preferably much smaller than illustrated). In particular, the transition layer 34 comprises a mixture of diamond crystals together with a catalyst/binder materal and pieces of precemented carbide which has been pressed under sufficient heat and pressure to cause the adjacent diamond crystals to bond to each other and to the precemented carbide pieces. The transition layer 34 also comprises an amount of residual catalyst/binder material left in the polycrystalline structure after pressing. The preferred volume concentration of polycrystalline diamond (including any pores and residual catalyst/binder) in the transition layer 34 is from about 20% to about 80%, and most preferably is about 40% to about 50%.

Directly adjacent to the transition layer 34 is a top (as here drawn) layer 35 which includes the exposed friction surface 39. This top layer 35 comprises polycrystalline diamond 38. In particular, the PCD 38 is formed from a quantity of diamond crystals in combination with a catalyst/binder material that has been pressed under sufficient heat and pressure to cause the adjacent diamond crystals to bond together. Preferably, the catalyst/binder material is a cobalt powder and is present in this top layer 35 and the transition layer 34 in a 1 to 10 volumetric ratio with the diamond. Alternatively, the catalyst binder for this top layer 35 can be derived either partially or entirely from the binder which has migrated from the transition layer 34. Also, the catalyst/binder may be provided in the form of a separate disc which is allowed to melt and thereafter migrate through the diamond crystals.

Figure 4:
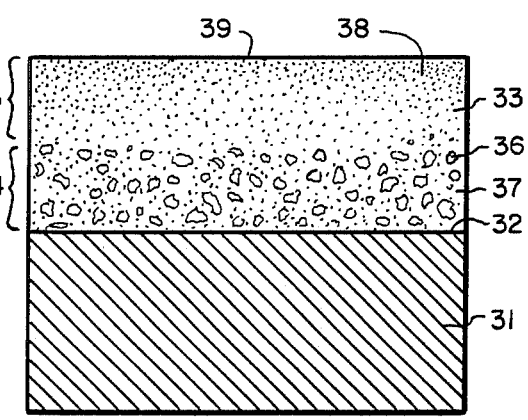
FIG. 4 is a cross-sectional view taken along line 4—4 of FIG. 3.

FIG. 4 is a cross section taken along line 4—4 of FIG. 3. The transition layer 34 meets the substrate 31 at an interface 32. As mentioned above, in the typical prior art composite compact, the interface between the substrate and the PCD layer is a potentially weak point in the structure because of the stresses that can occur due to the thermal expansion differential. However, with the transition layer 34 of the present invention, the thermal expansion problems are moderated because the transition layer as a whole will have thermal expansion characteristics somewhere between those of the cemented carbide substrate 31 and the polycrystalline layer 35. That is, during the cooling stage after the pressing of the compact 30, the transition layer will shrink more than the PCD layer 35 but less than the substrate 31. As a result, the strain to the composite compact's structure is greatly reduced, particularly at the interface 32.

This is an important advantage. The different shrinkage rates of the cemented carbide substrate and the PCD layer in the prior art compacts caused cracking in the PCD layer which resulted in a rejection rate as high as 30%. In contrast, batches of composite compacts made with a transition layer according to this invention has shown a rejection rate due to cracking of 5% or less.

FIG. 4 also demonstrates another advantage of the present invention. As can be seen, at the interface 32 between the substrate 31 and the transition layer 34, there will be a number of the precemented carbide pieces 36 adjacent to the substrate 31. During the press cycle, these adjacent carbide pieces fuse to the substrate 31. As a result, the interface between carbide and polycrystalline diamond is made non-planar. In this way, potential stresses between the carbide substrate and the PCD are further reduced.

Another important advantage of the present invention is that it is possible to achieve the benefits of the composite PCD/carbide material while retaining a bearing friction surface of 100% PCD. This is advantageous because it alleviates some of the problems of the prior art PCD compacts while maintaining the maximum wear and impact resistance possible. The 100% PCD working surface is particularly important in bearing applications where a homogeneous surface is most desirable.

Figure 5:
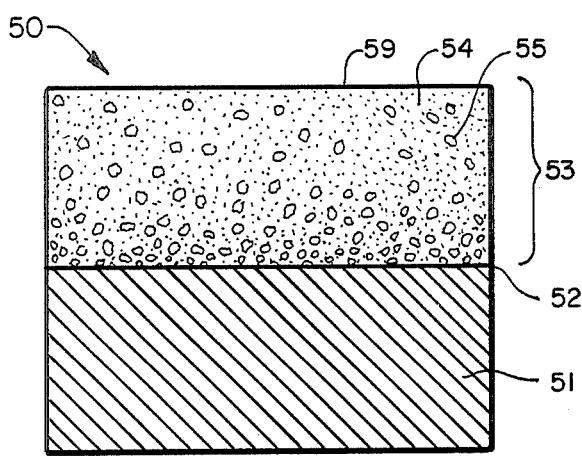
FIG. 5 is a cross-sectional view of another embodiment wherein the the volume percent of diamond decreases in the direction away from the exposed surface.

FIG. 5 is a cross section of a composite compact 50 made according to another embodiment of the present invention. In particular, this embodiment, rather than having two distinct polycrystalline layers, has one polycrystalline layer 53 which comprises a mixture of PCD 54 and precemented carbide 55. The concentration of the PCD is highest at the exposed or working surface 59. Preferably, the concentration of PCD 54 is 100 volume percent (including residual catalyst/binder material) as shown here. The concentration of PCD 54 gradually decreases on a gradient in the direction away from the exposed surface and toward the interface 52 with the substrate 51. In other words, there is an increase in the volume percent of precemented carbide as one moves in this same direction. Most preferably, the volume percent of PCD 54 would be at or near 0% at the interface 52.

Alternatively, this embodiment can be described as having several thin layers each of which decreases in PCD concentration when moving away from the layer including the exposed or working surface 59. In practice, this is the easiest way to achieve this embodiment. That is, the gradual transition can be produced by sequentially placing several thin layers of increasing polycrystalline diamond concentration into the pressing cell to make the graduated compact 50.

It may be preferable to have more than one transition layer. For example, a preferred bearing in a roller cone rock bit has two transition layers. The first transition layer, which is interfaced with the PCD layer, has approximately 60 volume percent diamond and the second transition layer, which is interfaced with the first transition layer, has approximately 40 volume percent diamond. This multiple transition layer configuration contributes to the wear and impact resistance of bearings normally used in very hostile down hole drilling environments.

In bearing applications, where bearings are typically subjected to tremendous frictional wear, it is preferable to have the PCD layer thicker than in other applications. In the above embodiment, the PCD layer should be approximately 0.015" thick, the 60% PCD transition layer should be approximately 0.010" thick, and the 40% PCD transition layer should be approximately 0.015" thick. The thicker PCD layer provides more opportunity for shape correction on contoured pieces, allowing for correction of from 0.005 to 0.010" in the PCD layer in the polishing steps, while still yielding a bearing having a PCD thickness of at least 0.005 to 0.010".

Despite the notable advantages of multiple transition layers, particularly in terms of impact resistance and load bearing capacity, it is preferable to have only one transition layer in PCD bearings. A single transition layer is particularly preferred in applications where wear life is a primary concern because the PCD layer can then be thicker, thereby extending the wear life of the bearing. A bearing with a single transition layer is also much simpler, and therefore less costly, to manufacture.

Another method of producing a graduated compact 50 involves the use of carefully controlled and changing addition rates of the diamond and the precemented carbide pieces to the pressing cell. Still another method involves the use of carefully controlled centrifugation of diamond and precemented carbide mixtures. This centrifugation method may require a dispersion medium such as acetone which could be easily removed prior to pressing.

It should be noted that although all of the embodiments illustrated have included a substrate, there are many applications for the PCD composite compacts of the present invention which will not require such a substrate. Indeed, the present invention offers the advantage that the carbide containing transition layer can be directly brazed to a support. That is, it is possible to braze directly to the transition layer because the braze can attach to the pieces of carbide in the composite material.

Rotary Rock Bit

U.S. patent application Ser. No. 864,681, filed concurrently herewith, and incorporated herein by reference, describes a preferred configuration for a rotary rock bit in which transition layer bearings may be used. The configuration of this rotary rock bit is described in detail below.

FIG. 6 is a sectional view showing one preferred embodiment of the present invention. The roller cone rock bit of this embodiment comprises a main bit body 131 which has an end 132 which is adapted to be threadably attached to a drill string 130. A leg 134 extends down from the main bit body. This embodiment also includes two other legs not shown which would be equally spaced around the bit body. Bits have been designed with one, two, three or more legs; such bits are within the scope of this invention. A journal 135 is adjacent to the leg 134 and extends at a downward and inward angle. A roller cone 136 is rotatably mounted on the journal 135. Cutters 137 are mounted in the roller cone for engaging the bottom of the hole. One advantage of this particular configuration is that by simplifying the bearing structure geometry, the roller cone may be made thicker, thereby allowing for deeper pockets for the cutters 137. Alternatively, the roller cones may have integral teeth or annular ridges for engaging material.

Gage inserts 138 are mounted on the gage row of the cone to engage material on the side of the hole and serve the important function of maintaining a constant diameter of the hole. As this gage row wears, forces from the side of the hole in the direction indicated by arrow C increase and otherwise tend to push the cone off its original axis of rotation.

Figure 7:
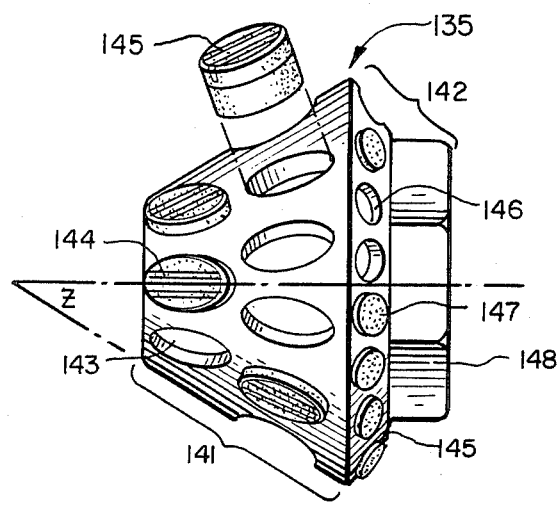
FIG. 7 is a perspective view of a frustoconically shaped journal bearing suitable for use in the embodiment of FIG. 6.

Referring also to FIG. 7, the journal 135 which is affixed to the leg 134 comprises a distal portion 141 and a proximate portion 142. The distal portion 141 is frusto-conically shaped. Most preferably, the included angle Z is about 32.5 deg.

The distal portion 141 includes holes 143 which hold polycrystalline material bearing inserts 144. The holes 143 are positioned and each of the inserts 144 are shaped so that the bearing surfaces of the inserts lie within a frusto-conical surface, which frusto-conical surface defines the main journal bearing surface of the journal 135. Currently, it is preferred to use two annular rows of inserts, the most distal row having 6 equally spaced inserts, and the other having 8 equally spaced inserts. For reasons to be discussed below, the depth of the holes 143 is preferably selected so that each of the inserts 144 protrude slightly from the surface of the journal 135.

The fracture resistance and load bearing capacity of the PCD bearing inserts is greatly improved by use of transition layer PCD.

To date most uses of PCD have been for cutting, grinding or abrading operations. It would therefore be thought that PCD is too rough or abrasive to be successful as a bearing. However, it has been found that when two PCD surfaces are well polished and fit together well, that the coefficient of friction is actually quite low. The value has been measured as low as 0.005 over wide ranges of loads and speeds ranging up to 40,000 lbs. axial pre-compression and 1,000 r.p.m. In fact, most likely due to its high-compressive strength, the coefficient of friction remains low over an impressive range of applied loads. This low coefficient of friction at high applied loads is very important in relation to the frusto-conical geometry, with its attendant high applied loads that result from the wedge effect of the frusto-conical journal on the cone.

Another advantage which was discovered in using PCD for the bearings is PCD's high thermal conductivity. In particular, it is important for the bearings to be able to dissipate the heat which builds up during use. Despite PCD's high thermal conductivity, however, it is still deemed advantageous to provide means for cooling the bearings. By so doing the extent of thermal degradation of the PCD is greatly reduced.

Still another advantage of using PCD is its relative inertness. In most bearings which are subjected to high loads at high temperatures, the contacting surfaces of the bearing frequently weld together. To avoid this problem, many such bearings are made from dissimilar metals, a solution which can introduce new problems related to dissimilar coefficients of thermal expansion etc. In contrast, when PCD is used in the present invention, the fact that diamond is relatively unreactive and thermally stable obviates these problems.

The proximate portion 142 of the journal 135 preferably also includes a frusto-conically shaped surface 145. This surface is oriented so that the diameter of the surface decreases in the direction toward the leg 134. Most preferably, this surface 145 is shaped and oriented so as to be perpendicular to the frusto-conical surface of the distal portion 141. In alternative embodiments, this surface can be planar disc shaped.

Holes 146 are provided to hold inserts 147. The holes 146 are positioned and the inserts 147 are shaped so as to provide a frusto-conically shaped cone retention bearing surface of the journal 135. Currently, it is preferred to use 15 equally spaced inserts in this cone retention bearing. As with the main journal bearing surface, the depth of the holes 147 is also selected so that each of the inserts 147 protrude slightly from the surface 145 of the journal 135.

The proximate portion 142 also includes an attaching portion 148 which is preferably interference fitted into a like shape hole in the leg. Most preferably, to ensure the best interference fit, the attaching portion 148 and the hole in the leg are cylindrical. In an alternative embodiment, the attaching portion is configured so as to index with some feature of the leg 134 to thereby prevent rotation of the journal 135 once attached. In the embodiment shown here, the attaching portion 148 has a hexagonal shape which mates with a hexagonal recess 149 in the leg 134. Most preferably, a plurality of pins 151 are inserted into holes 153 in the journal and holes 152 in the leg to further prevent the journal from rotating. Three such pins 151 are included on the depicted embodiment. In the most preferred embodiment, there are no indexing pins. Instead, in the interest of simplicity and structural integrity, the interference fit and the tension on the bolt 161 are relied upon to maintain the journal in place.

When using a non-cylindrical attaching portion 148, it is preferable that the shape of the attaching portion 148 and thus the shape of the recess 149 in the leg together with the number of indexing pins is selected so that the journal can be indexed at different points of rotation with the leg. In this way, it is possible to extend the life of the main journal bearing because it is the bottom portion of the journal which is subjected to the majority of the load. As a result, the bottom portion would be expected to wear faster. In this depicted embodiment however, it is possible to "rejuvenate" the main journal bearing by separating the journal from the leg, rotating the journal 120 degrees, and reattaching the journal to the leg. The most preferred embodiment which includes a cylindrical attaching portion can likewise be rotated to prolong the life of the journal bearing.

Figure 12:
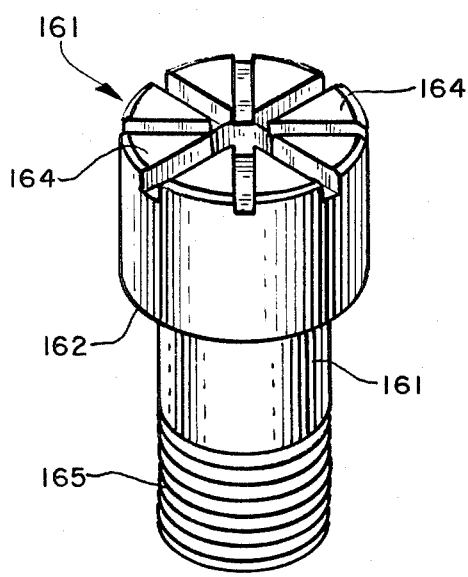
FIG. 12 is a perspective view of the bolt used to attach the journal to the leg in the embodiment depicted in FIG. 6.

A bolt 161 is used in this embodiment to attach the journal 135 to the leg 134. Further details of this bolt 161 are shown in greater detail in FIG. 12. The bolt includes a head portion 162 which has an underside shaped to fit within a recess 163 in the leg. The top 164 of the head portion 162 is configured to facilitate connection with a tool to tighten the bolt. The threaded portion 165 of the bolt is threaded into the journal 135.

It will be noted that, in the embodiment depicted, the threads do not extend the full length of the bolt 161. This is preferable because it allows the bolt to be tightened to a point wherein it is placed in a relatively high degree of tension. Most preferably, the bolt is tightened with about 1300 foot/pounds of torque. In this most preferred embodiment, the bolt is made of Vasco T-200 steel and the torque pre-stresses the bolt to about 85 percent of its yield strength. This is desirable because it allows the bolt to be pre-stressed to a level above the stress it will see during use. As such, cyclic fatigue of the bolt will be reduced.

It is also important to note that, in this most preferred embodiment, the bolt 161 should not experience a bending moment. In particular, because the bolt 161 holds the attaching portion 148 tightly in the receiving hole in the leg, the journal 135 cannot move transversely to the bolt 161 relative to the leg 134. In addition, there is preferably a space 166 between the side of the bolt 161 and the hole through the journal 135, in order to further prevent the bolt from experiencing a bending moment.

Preferably, at least one shim 166 is included between the journal 135 and the leg 134. The shim 166 will have the same shape as the attaching portion 153 of the journal and will also have holes to match the holes for the indexing pins 151. The use of shims is desirable in the preferred embodiment because of the ability it provides to adjust the alignment of the journals. In particular, it is important that, when the bit is manufactured, the cones are positioned and oriented such that when the bit is rotated all of the gage rows will rotate in a single circle, i.e., not in concentric circles. This is typically referred to as gage alignment. In this preferred embodiment, the use of shims allows the bit manufacturer to easily adjust the gage alignment by using thicker or thinner shims to thereby move each journal and thus each cone in or out.

Figure 8:
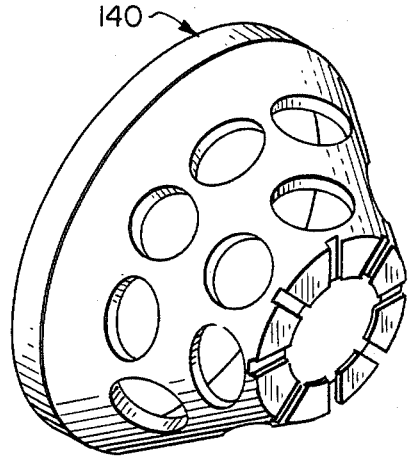
FIG. 8 is a perspective view of the shell used to position the inserts in the main roller cone bearing of the embodiment shown in FIG. 6.
Figure 9:
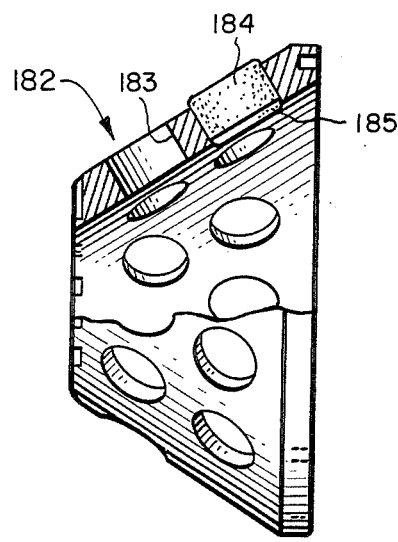
FIG. 9 is a side view in partial cross section showing the shell depicted in FIG. 8.

A roller cone 136 is mounted on the journal 135. The roller cone 136 has a main roller cone bearing 181 (see FIGS. 8 and 9) which preferably comprises a shell 182 which has selectively placed holes 183 for receiving polycrystalline material inserts 184. The holes 183 are placed and the bearing surfaces 185 of the inserts 184 are shaped so that the bearing surfaces 185 lie in a frusto-conical surface. This surface mates with the frusto-conical main journal bearing surface. The shell 182 is placed in a mating cavity formed in the roller cone to thereby provide the main roller cone bearing. Currently, it is preferred to use two annular rows with 8 equally spaced inserts in the more distal row and 9 equally spaced inserts in the other row. In this preferred embodiment, the holes 183 pass all the way through the shell 182. In this way, the polycrystalline material bearing inserts press directly against the inside of the cone which thus helps to maintain the position of the shell 182 within the cone 136. In alternative embodiments, the holes do not pass all the way through. In such embodiments, it may be desirable to provide some form of indexing in order for the shell to retain its position.

In other alternative embodiments, a shell is not used, and inserts are set directly into holes formed in the cavity of the roller cone.

Figure 10:
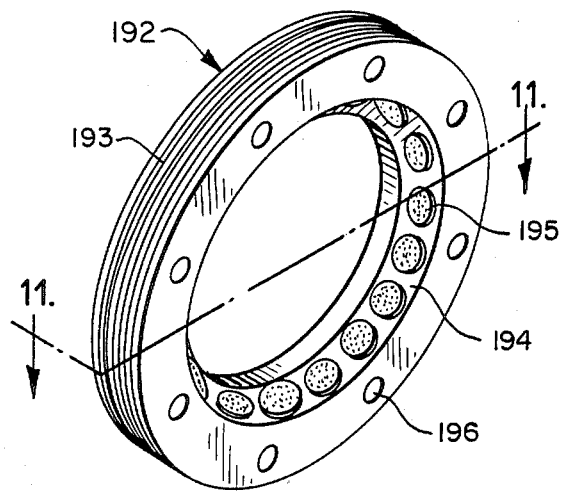
FIG. 10 is a perspective view of the threaded cone retention means used in the embodiment depicted in FIG. 6.
Figure 11:
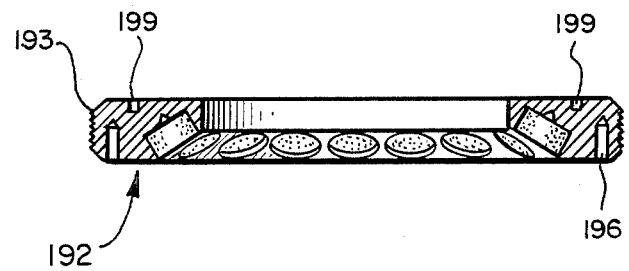
FIG. 11 is a cross-sectional view taken along line 11—11 in FIG. 10.

The roller cone 136 in this preferred embodiment is configured with threads 191 in its cavity near the leg 134. A roller cone retaining ring 192 is adapted to thread into the cone at this point to thereby retain the cone 136 on the journal 135. Further details of the retaining ring 192 are shown in FIGS. 10 and 11. The ring includes threads 193 formed on its periphery for threading into the cone 136. The ring also includes a frusto-conical surface 194 which has a plurality of holes into which polycrystalline material inserts 195 are inserted. The holes are placed and the inserts 195 are shaped so that the bearing surface of the inserts lie in a frusto-conical plane, which plane mates with the frusto-conical cone retaining bearing surface on the proximate portion 142 of the journal 135. Currently, it is preferred to use 16 equally spaced inserts in this retention means bearing.

The ring 192 also includes indexing holes 196 into which indexing pins 197 are inserted to thereby index with holes 198 in the shell 182. In this way, when the ring is rotated into the cone, the shell rotates with it. However, it is preferred to omit the pins for reasons of simplicity. Particularly in light of the fact that it should not matter is the shell rotates with the retaining ring.

Preferably, a shim 186 is placed between the ring 192 and the shell 182. By varing the thickness of the shim 186, the tightness between the bearings can be adjusted to the desired level. Holes 199 are provided in the ring 192 for attaching a tightening tool thereto. It is currently preferred to tighten the threaded ring to the point at which the cone can be manually rotated about the journal, but at which there is no play between the bearings.

Although, the polycrystalline bearing of the present invention can perform at high loads and rotational speeds without any lubrication, it has been shown to be desirable to lubricate and especially to cool the bearings. This is advantageous because the PCD is susceptible to thermal degradation, particularly at the point of surface contact between complementary bearing members. It has been found that overheating of the PCD bearing surfaces can lead to early wear as the diamond reverts to graphite more rapidly at higher temperatures. Despite the surprisingly low coeffecient of friction of PCD, the extremely high loads generated in earth boring applications can cause frictional heat that can adversely affect the wear resistant properties of PCD. It is therefore desirable to minimize thermal degradation by providing means for cooling the bearing.

In the most preferred embodiment, lubrication and cooling are accomplished by simply leaving the bearing system open to the drilling fluid. It was a surprising result that a drilling fluid such as drilling mud could work well as both a lubricant and coolant for the bearing of the preferred embodiment. Drilling mud typically contains high quantities of abrasive silicate particles. Most bits are designed to keep the mud away from the bearings. With the present invention, when the bearing is comprised of polycrystalline diamond, these silicate particles are actually ground by the polycrystalline diamond surfaces and result in fine particles which may function as a lubricant on the diamond bearing surfaces. Accordingly, the preferred embodiment does not require seals to keep the drilling mud away from the bearings, but rather uses the drilling mud as a lubricant and coolant.

In addition, it has been found that the design of the most preferred embodiment encourages a flow of the drilling fluid through the bearing system. In particular, because a nozzle 167 for the drilling fluid is located at the center of the bit body, this causes a pressure differential between the central space between the cones and the space outside of them. As a result, the pressure differential encourages the drilling fluid to flow into the bearing system at the space 168, which space is between the rotating cone and the leg near the top of the journal 135, through the bearing system and out of the bearing system through the space 169, which space is near the bottom of the journal 135. Added to this flow encouraged by the pressure differential is the flow wich is caused by the rotation of the cone. Preliminary tests have shown that these two factors produce sufficient fluid flow through the bearing system to produce a sufficient level of cooling and lubrication.

In an alternative embodiment shown in FIG. 6, the lubrication and cooling is also aided by the provision of a passage 172 which communicates at one end with a central cavity 173 in the bit body 131 which in turn communicates with a source of drilling fluid in the drill string. A grate or screen 174 is located in the central cavity 173 to prevent large particles for entering the passage 172. The other end of the passage 172 communicates with the hole through the shim 149 which in turn communicates with a passage 175 in the journal 135. In this way, a stream of the drilling fluid can pass over the journal/roller cone bearings and the cone retention bearings. In embodiments wherein the journal can be rotated to different points, there is provided the necessary number of passages 175 in the journal 135.

Figure 6A:
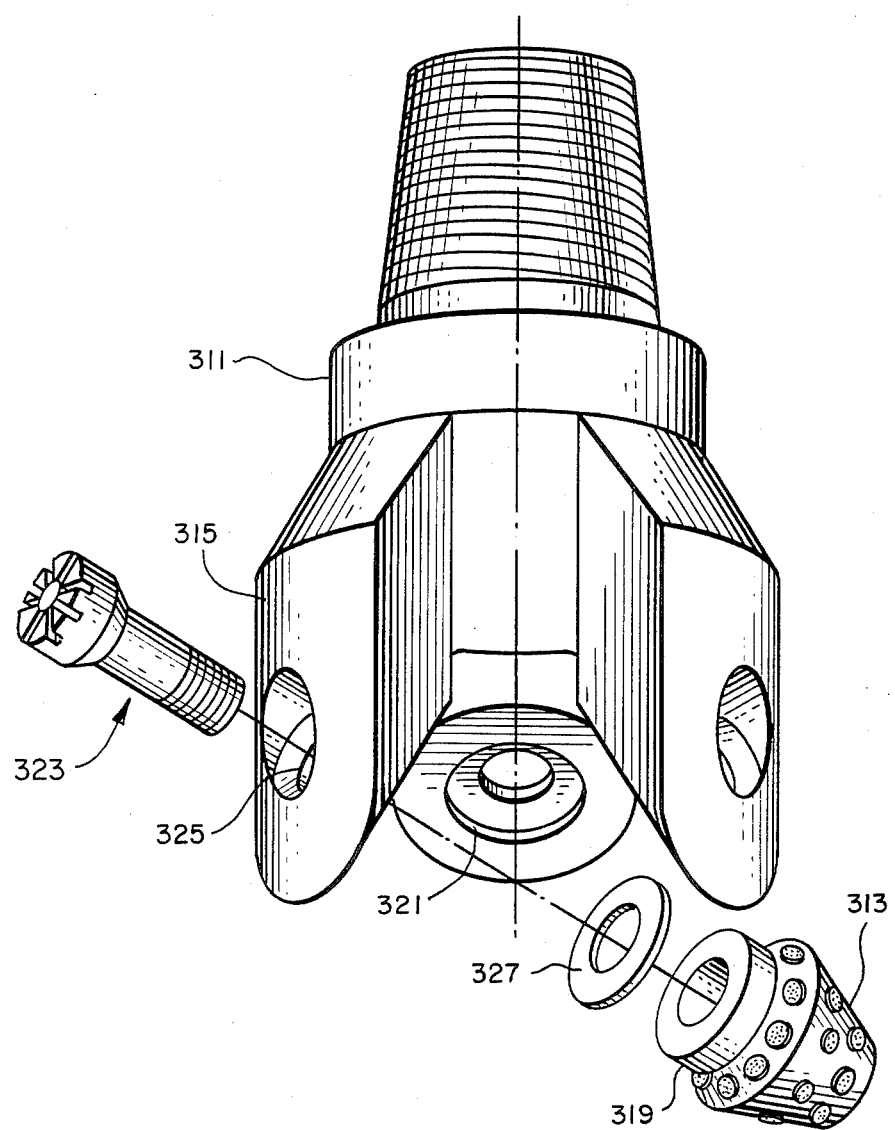
FIG. 6a is a perspective view of the rock bit of FIG. 6.

FIG. 6a is a perspective view of the bit body 311 showing how one of the three frusto-conically shaped journal 313 is attached to one of the legs 315. In particular, the attaching portion 319 of the journal 313 is inserted into the mating hole 321 in the leg and a bolt 323 is passed through a hole 325 in the leg and threaded into the journal 313. For reasons to be discussed below, it is desirable to use a shim 327 between the journal 313 and the leg 315. Most preferably, the attaching portion 319 is cylindrical and is interference fit into the hole 321. It will be noted that, because the bearing system of the present invention does not require a grease lubricant, the design of the bit body is somewhat simplified.

As mentioned above, it is preferable to select the depth of the holes into which the polycrystalline material bearing inserts are placed so that the inserts protrude slightly from those holes. This is done in order for the cooling liquid to be able to pass around each of the inserts. In addition, the protrusion of the inserts prevents the non-bearing surface from contacting.

It has been observed that providing the polycrystalline bearing in the form of equally spaced inserts, as opposed to a single continuous surface, has lead to improved cooling. Between each spaced insert is a gap through which cooling fluid continually flows. As an opposing insert passes from one spaced insert to the next spaced insert, it passes over the gap and the cooling fluid flowing through the gap comes in direct contact with its PCD surface, thereby providing rapid cooling. The effect of this cooling is to maintain the temperature of the PCD well below its thermal degradation point so as to minimize wear of the PCD. Thus, by using PCD inserts rather than a continuous surface, the PCD bearings are allowed to cool much more efficiently.

Figure 14:
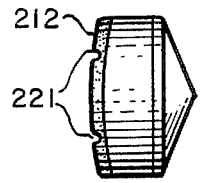
FIG. 14 is a side view of a polycrystalline material bearing insert shaped to fit in the journal of the embodiment depicted in FIG. 6.
Figure 14A:
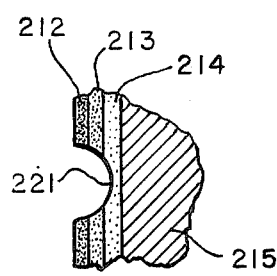
FIG. 14a is a sectional view of the insert shown in FIG. 14.
Figure 14B:
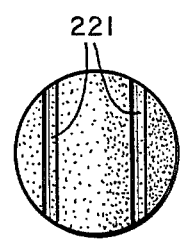
FIG. 14b is a top view of the insert shown in FIG. 14.

It has also been discovered that the cooling can be enhanced even further by providing grooves in the PCD bearing surfaces. As shown in FIG. 14a, the bearing surface of the PCD insert can be subdivided by placing one or more grooves in the bearing surface. In this way, the time between cooling by the drilling fluid is shortened, thus allowing the PCD bearings to run at high pressures and velocities without undergoing thermal degradation. These grooves can either be put into the PCD surfaces during the formation of the PCD, or they can be cut into the PCD surfaces after formation. Preferably, the grooves are cut into the PCD surface by a wire Electric Discharge Machine (EDM). Because of their convex shape, it is easier to cut the grooves into the PCD surfaces of the journal bearing races. As shown in FIG. 14b, the grooves are preferably oriented parallel to each other and such that they are convergent with the rotational axis of the cone. The grooves are preferably U-shaped, approximately 0.030" deep and 0.030" wide. In a multiple transition layer bearing, such a groove would normally cut through the PCD layer and first transition layer, and cut partially through the second transition layer.

It will be observed that a space 176 is left between the distal end of the journal 135 and the otherwise adjacent surface of the shell 182. It should also be noted that neither the roller cone 136 nor the retaining ring 192 contact the leg 134. These two features are important because they allow the main roller cone bearing 181 to be freely compressed against the main journal bearing. In other words, in the preferred embodiment, the frusto-conically shaped main journal bearing is the only surface on the journal or leg which prevents the roller cone from moving axially in the direction indicated by arrow B.

General mechanical principles tend to lead those skilled in the art to conclude that the frusto-conical geometry would be inappropriate for friction bearings which experience high forces directed axially—such as in the present design. A frusto-conical friction bearing with high axial loads would act much like a wedge, in which the force normal to the face of the wedge would exceed the applied downward force.

Because PCD, although very strong in compression, is relatively weak in tension it was once thought that if one were to use it as a bearing, it would be best for it to be pre-loaded with compressive forces in order to minimize the tensile forces the PCD would experience. In other words, the pre-compressed bearing was thought to be less likely to exhibit bearing "chatter" which was deleterious to the PCD structure. This was especially thought to be true with the roller cone bit application where during drilling the PCD bearing faces uneven loads from multiple directions. However, it has been discovered that the use of transition layer PCD in the bearings has minimized, if not eliminated, the need for precompression. The presence of the transition layers therefore greatly reduced cracking of the PCD.

In the method of fabricating the first preferred embodiment, it is necessary to first insert a journal 135 into each cone 136. The ring 192 is then threaded into the cone and tightened. Preferably, a shim is used to achieve the desired tightness between the bearings. Once the ring has been tightened, the journal is mounted on the leg 134 of the bit. The bolt 161 is passed through the outside of the leg and threaded into the journal. The bolt is tightened to the desired torque, as stated above, with the particular bolt used in the most preferred embodiment, the torque is preferably about 1300 ft. lbs. which is about 85% of the yield strength of the bolt. As mentioned, it has been observed that putting a relatively high level of torque on the bolt is advantageous in that it prestresses the journal and thus reduces the cyclic fatigue experienced by the journal. A shim is preferably used between the journal and the leg to thereby accurately adjust the gage alignment.

Figure 13:
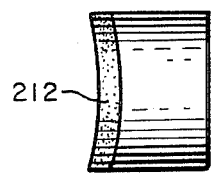
FIG. 13 is a side view of a transition layer bearing insert shaped to fit in either the roller cone or in the retention means of the embodiment depicted in FIG. 6.

FIG. 13 shows a top side view of a concave polycrystalline diamond insert which can be used in either the main roller cone bearing or in the bearing of the cone retaining means. FIG. 14 shows a top side view of a convex polycrystalline diamond insert which can be used in either of the bearings on the journal. The PCD layer can be shaped during the ultra high pressure/temperature pressing cycle by being sintered adjacent to a carbide substrate which has previously been shaped correctly. Likewise, the inserts in the roller cone bearing are pre-shaped to conform to the curvature and slope of the inside surface of the roller cone bearing. The pre-shaping of the diamond layer to as near the required shape as possible, as opposed to starting with flat or other nonconforming shapes, has been found to be important for three reasons.

First, polycrystalline diamond is extremely wear resistant. Accordingly, it would require large amounts of time and effort to grind or cut the PCD to fit the final shape.

Second, because the PCD is relatively brittle, it is important that before the polycrystalline inserts are allowed to wear against each other, they present smooth surfaces. If the polycrystalline diamond pieces make point to point contact, they will likely chip or crack from the excessively localized forces.

Third, it has been discovered that the final finishing of the PCD surfaces can be accomplished by simply running the two bearings against each other at high speeds and at high loads. See, copending application of David R. Hall Ser. No. 06/747,163, which is directed to this finishing process. The entire disclosure of this application is incorporated herein by reference. This simplification of the finishing process would not be possible if the PCD surfaces were not already close to their final shape.

In addition to the preferred method of using PCD inserts set into frusto-conical base members, there exist alternative methods of forming PCD bearing surfaces with the frusto-conical shape of the present invention. Theoretically, it may be desirable to produce a bearing for the present invention with a single piece of PCD, with or without a carbide backing, which could be used for the journal or roller cone bearing. However, using present high pressure technology, it is not possible to produce pieces of PCD of a sufficient size.

A possible alternative is to produce several PCD segments or "tiles" which could be fit together to produce a continuous surfaces of PCD for the bearings of the invention. These tiles could be used to cover the entire frusto-conical surfaces, or alternatively could be arranged in annular rows or other configurations which would provide sufficient mating PCD surfaces to support the loads between the roller cone and journal while facilitating rotation of the roller cone about the journal.

Although other alternatives for incorporating the PCD into the journal and roller cone bearings are available, the first and second preferred embodiment, i.e., pre-shaped PCD inserts held in frusto-conical bases, has exhibited certain surprising and important advantages. Naturally, in light of its relatively high cost of production, it is economical to use only as much PCD as necessary. It was thought however, that a continuous PCD surface would be required to provide sufficient smoothness for rotation and load carrying capability. Surprisingly, the bearing constructed according to the preferred embodiments has exhibited remarkable smoothness in rotation and load carrying capability. A further advantage of using discrete PCD inserts in the bearing is that it allows for improved cooling and lubrication of the PCD surfaces. With the slight protrusion from the base member, the drilling mud can flow around each insert. Also, because the PCD inserts do not present a continuous surface, the drilling mud can pass directly over the bearing surfaces.

Fluid Motor Assembly

Figure 15:
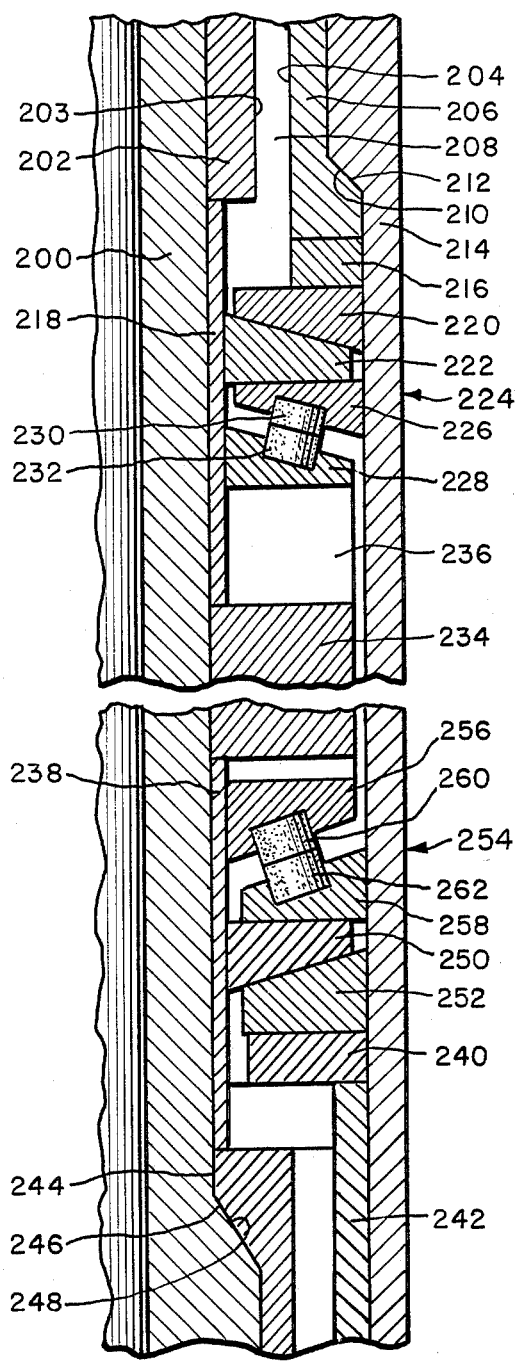
FIG. 15 is a sectional view of the bearing portion of a down hole fluid motor assembly.

FIG. 15 is a sectional view of the bearing section of the down hole fluid motor assembly. The structure of this bearing section is substantially the same as that shown and described in Nagel et al. U.S. Pat. No. 4,410,054 which, in order to show and describe the relationship of the bearing section to the other sections of the motor assembly, is incorporated herein by reference. Only the bearing section of the motor assembly, in which the transition layer PCD bearing members are used, is described in detail herein.

Bearing shaft 200 is provided with a bearing shaft sleeve 202. The outer surface 203 of sleeve 202 is spaced from the inner surface 204 of ring spacer 206 to define an annular passage 208. The lower end of ring spacer 206 is enlarged and has a shoulder portion 210 which abuts the bevel or shoulder 212 on housing 214. The lower end of spacer 206 abuts the upper end of bearing housing spacer 216 to permit lubricant flow into the bearing area below. The bearings are positioned below sleeve 202 and spacer 206 and are sealed against lubricant leakage at the bottom of the drill by a radial seal.

A bearing sleeve 218 is positioned on bearing shaft 200 for rotation therewith and abuts the lower end of bearing shaft sleeve 202. Below ring spacer 206, there are provided a pair of beveled annular spacer rings 220 and 222 which abut the uppermost bearing means 224. The bearing means 224 consists of annular bearing rings 226 and 228 which rotate relative to one another and on which the bearing members 230 and 232 are mounted in bearing relationship.

The bearing means 224 consists of upper annular bearing ring 226, lower annular bearing ring 228, and a plurality of transition layer PCD bearing members 230 and 232 mounted in bearing relationship and spaced equally around the bearing rings. Bearing rings 226 and 228 may have tapered conical faces with bearing members 230 and 232 respectively mounted thereon using well known brazing techniques. Bearing members 230 and 232 are manufactured according to the process described in more detail above.

Lower bearing means are constructed similiarly to the upper bearing means 224. The bearing members 230 and 232 in each of the bearings are of a size and sufficient in number around the bearing rings 226 and 228 so that each bearing element is wider than the circumferential distance between adjacent bearing elements. In addition there is preferably one more of the bearing elements on one of the bearing rings 230 or 232 which assures that the bearing elements are overlapping most of the time.

Referring again to FIG. 15, upper bearing ring 226 fits tightly against housing 214 and has a clearance relative to sleeve 218 so that it rotates with the housing. Lower bearing ring 228 fits tightly on sleeve 218 and has a clearance relative to housing 214 so it is fixed relative to the rotating shaft 200 and rotates therewith.

The conical faces of rings 226 and 228 are closely spaced in substantially parallel relation. The diamond bearing members 230 and 232 extend from the conical faces substantially normal to or radially of the rings in which the are supported and into bearing contact with each other. The diamond bearing members 230 and 232 therefore are in a position of relative bearing movement along a conical contacting surface midway between the conical surfaces of their supports 226 and 228.

A thrust bearing spacer ring 234 is fitted tightly on bearing shaft 200 and having slots 236 permitting fluid flow thereby. The lower end of spacer 234 also abuts the upper ring 256 of the bearing member 260.

The lower bearing system 254 consists of upper ring 256 which fits tightly on bearing shaft sleeve 238 and has a small clearance relative to the inner surface of housing 214 so that it is fixed relative to shaft 200 and rotates therewith. There is also provided a lower bearing ring 258 which fits tightly against housing 214 and has a clearance relative to sleeve 238 so that it remains stationary relative to the housing.

A plurality of bearing members 260 and 262 are mounted on the bearing rings 256 and 258 as described above for the upper bearing system. The bearing members 260 and 262 are therefore in a position of relative bearing movement along a conical contacting surface.

The conical faces on bearing rings 256 and 258 are tapered in the opposite direction from the conical faces of bearing rings 226 and 228.

Immediately below the bearing ring 258 are a pair of beveled annular spacer rings 250 and 252 which bear against annular support ring 240. Bearing spacer 242 fits tightly within the bearing housing 214 and supports annular support ring 240. There is also positioned bearing shaft spacer ring 244 which has a shoulder 246 which abuts against shoulder 248 on the bearing shaft. Space between spacers 242 and 244 is sufficient for passage of lubricant to the upper end of the rotary bearing seal.

EXAMPLES

Example 1

A cemented carbide substrate was placed in the bottom of a pressing unit as described above. The substrate was a presintered disc of tungsten carbide with a cobalt binder present as 14 weight percent of the disc. The disc was obtained from the Tungsten Carbide Manufacturing Inc. and bore a composition code number of 614.

A mixture of diamond crystals, catalyst/binder material, and precemented carbide pieces was obtained by thoroughly milling diamond, cobalt powder and pieces of precemented tungsten carbide grit in a tungsten carbide lined ball mill. The resultant mixture had a particle size of diamonds of about 65% at 4-8 microns, and about 35% at 0.5-1 micron. A catalyst binder in the form of a cobalt powder was included as about 13 weight percent of the diamond cobalt mixture. The precemented carbide pieces had an average size of 30 microns and a cobalt binder content of 11%. The precemented carbide pieces comprised 60 volume percent of this mixture.

The mixture along with all other mixtures in these examples was cleaned and reduced by treating alternately with hydrogen gas and vacuum at 800° C. A 0.4 mm (0.015 inch) layer of this mixture was poured on top of the substrate.

Next a mixture of diamond crystals and cobalt powder, with similar particle sizes and cobalt content to that of the transition layer, was poured on top of the transition layer. This top layer was also 0.4 mm thick.

The pressing cell was placed between the anvils of a cubic press and pressurized to about 60 kbars and heated to about 1450° C. for approximately 2 minutes. The pressure and heat were reduced and the cell was allowed to cool.

The compact recovered showed no signs of cracking. In a wear test against a turning granite log, the compact showed showed wear resistance similar to standard PCD compacts.

Example 2

A compact was produced as in Example 1 with the exception that the top layer included precemented carbide pieces in an amount of 40 volume percent of the layer. The compact recovered also showed no signs of cracking.

Example 3

A compact for a PCD transition layer bearing was produced as in Example 1 with the exception that four layers were formed on top of a steel substrate. In particular, a 0.25 mm thick layer consisting of precemented tungsten carbide grit (i.e., 100 volume percent) was placed on a steel substrate. Next, a layer of similar thickness consisting of 60 volume percent precemented tungsten carbide grit and 40 volume percent diamond crystals with cobalt binder was placed in the cell. On top of that, a 0.25 mm thick layer consisting of 40 volume percent precemented tungsten carbide grit and 60 volume percent diamond with its cobalt binder. Finally, the top layer was added which consisted of 100 volume percent diamond with its cobalt binder. The compact recovered showed no signs of cracking. In addition, there appeared to be no negative effects of using the steel substrate.

Example 4

A roller cone rock bit made pursuant to the present invention, and having PCD transition layer bearings made according to Example 3, was run in a down hole environment. The bit configuration was similar to that shown in FIG. 6. The only notable differences were that there was no indexing of the main roller cone bearing 181 and roller cone retaining ring 192, and there were no fluid passages 172. Nozzles were instead located between each leg of the rock bit. The bit was a 7⅞" EDT milled tooth bit, differing from FIG. 6 principally in that it had no PCD teeth on the outside of the roller cone. The bit had a diamond bearing assembly, bolt retention means and cone assembly, one-piece bit body of ultra-high strength steel, streamline bit configuration, and optimum angle nozzle placement so as to achieve maximum chip removal from the bottom of the hole.

The bit had an average weight on bit of 25,000 lbs. and was run at approximately 140 rpm, the maximum capacity of the rig. Actual drilling time was 9 hours 48 minutes. The total average rate of penetration was 129.8 ft./hr. The bit cut to a depth of 1306 ft., with the first half of the hole showing penetration rates upward of 265 ft./hr.

Example 5

Performance of transition layer PCD bearings made according to Example 3 was compared to the performance of non-transition layer PCD bearings. The comparison was made using a CBT (cone bearing tester) in which a bearing assembly is tested while varying the load and rpm. Non-transition layer PCD bearings cracked under loads from 5,000 to 7,000 lbs. and at rotational speeds up to 250 rpm. By comparison, the transition layer PCD bearings survived under pressures up to 30,000 lbs and at rotational speeds up to 250 rpm. This remarkable difference is currently attributed to the ability of the transition layer PCD bearings to withstand significantly greater loads.

It should be understood that the above-mentioned embodiments and examples are illustrative and descriptive and in no way limit the scope of the present invention. These and other modifications which are within the ordinary skill in the art are considered to lie within the scope of the invention as defined by the following claims.

I claim:

1. An earth boring apparatus comprising:
    a pair of rotatable members adapted for relative movement; and
    bearing means between the rotatable members, the bearing means comprising at least one pair of complementary friction bearing members mounted in bearing relationship, each bearing member comprising:
        a polycrystalline diamond layer with a surface for slidably contacting a complementary bearing member, said polycrystalline diamond layer comprising diamond crystals pressed under sufficient heat and pressure to create polycrystalline diamond material in which adjacent diamond crystals are bonded together; and
        at least one transition layer joined at an interface with the polycrystalline diamond layer and comprising a mxiture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which transition layer the polycrystalline diamond material and the precemented carbide pieces are interspersed in one another.

2. The earth boring apparatus of claim 1 further comprising a substrate for supporting the bearing member.

3. The earth boring apparatus of claim 2 wherein the substrate is comprised of cemented tungsten carbide.

4. The earth boring apparatus of claim 2 wherein the substrate is comprised of steel.

5. The earth boring apparatus of claim 1 wherein the transition layer comprises between 80 and 20 percent by volume diamond.

6. The earth boring apparatus of claim 1 comprising a second transition layer joined at an interface with the first transition layer, the second transition layer comprising a composite polycrystalline material containing a lower volume percent of diamond crystals than the first transition layer.

7. The earth boring apparatus of claim 6 wherein the first transition layer comprises about 60 percent by volume diamond and the second transition layer comprises about 40 percent by volume diamond.

8. The earth boring apparatus of claim 1 wherein the volume percent of polycrystalline diamond material varies in the transition layer and generally decreases along a gradient in the direction away from the interface.

9. The earth boring apparatus of claim 1 wherein the bearing means comprises a plurality of disc shaped bearing members.

10. The earth boring apparatus of claim 1 wherein the bearing means is a thrust bearing.

11. The earth boring apparatus of claim 1 wherein the surface of the polycrystalline diamond layer of the bearing members is shaped so as to lie in a substantially frusto-conically shaped surface.

12. A rotary rock bit comprising:
a main bit body;
connecting means at one end of the bit body for connecting the bit body to a drill string;
mounting means at the opposite end of the bit body for mounting at least one roller cone on the bit body for rotation around an axis transverse to the rotational axis of the bit body; and
bearing means between the bit body and the roler cone, the bearing means comprising at least one pair of complementary friction bearing members mounted in bearing relationship, each bearing member comprising:
a polycrystalline diamond layer with a surface for slidably contacting a complementary bearing member, said polycrystalline diamond layer comprising diamond crystals pressed under sufficient heat and pressure to create polycrystalline diamond material in which adjacent diamond crystals are bonded together; and
at least one transistion layer joined at an interface with the polycrystalline diamond layer amd comprising a mixture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which transition layer the polycrystalline diamond material and the precemented carbide pieces are interspersed in one another.

13. The rotary rock bit of claim 11 further comprising a substrate for supporting the bearing member.

14. The rotary rock bit of claim 12 wherein the substrate is comprised of cemented tungsten carbide.

15. The rotary rock bit of claim 12 wherein the substrate is comprised of steel.

16. The rotary rock bit of claim 11 wherein the transition layer comprises between 80 and 20 percent by volume diamond.

17. The rotary rock bit of claim 11 comprising a second transition layer joined at an interface with the first transition layer, the second transition layer comprising a composite polycrystalline material containing a lower volume percent of diamond crystals than the first transition layer.

18. The rotary rock bit of claim 17 wherein the first transition layer comprises about 60 percent by volume diamond and the second transition layer comprises about 40 percent by volume diamond.

19. The rotary rock bit of claim 11 wherein volume percent of polycrystalline diamond material varies in the transition layer and generally decreases along a gradient in the direction away from the interface.

20. The rotary rock bit of claim 11 wherein the bearing means comprises a plurality of disk shaped bearing members.

21. The rotary rock bit of claim 11 wherein the bearing means is a thrust bearing.

22. The rotary rock bit of claim 11 wherein the friction surface of the polycrystalline diamond layer of the bearing members is shaped so as to define a substantially frusto-conically shaped surface.

23. A fluid motor assembly comprising:
tubular housing means;
rotary shaft means supported in the housing means and adapted to support a drill bit;
motor means in the housing means actuated by flow of drilling fluid through the motor means and opearable to rotate the shaft means; and
bearing means in the housing means supporting the rotary shaft means, in which the bearing means comprises at least one pair of complementary bearing members mounted in bearing relationship, each bearing member comprising:
a polycrystalline diamond layer with a surface for slidably contacting a complementary bearing member, said polycrystalline diamond layer comprising diamond crystals pressed under sufficient heat and pressure to create polycrystalline diamond material in which adjacent diamond crystals are bonded together; and
at least one transition layer joined at an interface with the polycrystalline diamond layer and comprising a mixture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which transition layer the polycrystalline diamond material and the precemented carbide pieces are interspersed in one another.

24. The fluid motor assembly of claim 21 further comprising a substrate for supporting the bearing member.

25. The fluid motor assembly of claim 22 wherein the substrate is comprised of cemented tungsten carbide.

26. The fluid motor assembly of claim 22 wherein the substrate is comprised of steel.

27. The fluid motor assembly of claim 21 wherein the transition layer comprises between 20 and 80 percent by volume diamond.

28. The fluid motor assembly of claim 21 comprising a second transition layer joined at an interface with the first transition layer, the second transition layer comprising a composite polycrystalline material containing a lower volume percent of diamond crystals than the first transition layer.

29. The fluid motor assembly of claim 28 wherein the first transition layer comprises about 60 percent by volume diamond and the second transition layer comprises about 40 percent by volume diamond.

30. The fluid motor assembly of claim 21 wherein volume percent of polycrystalline diamond material varies in the transition layer and generally decreases along a gradient in the direction away from the interface.

31. The fluid motor assembly of claim 21 wherein the bearing means comprises a plurality of disk shaped bearing members.

32. The fluid motor assembly of claim 21 wherein the bearing means is a thrust bearing.

33. The fluid motor assembly of claim 21 wherein the surface of the polycrystalline diamond layer of the bearing members is shaped so as to lie in a substantially frusto-conically shaped bearing surface.

34. An earth boring apparatus bearing insert comprising:
- a polycrystalline diamond layer with a surface for slidably contacting a complementary bearing member, said polycrystalline diamond layer comprising diamond crystals pressed under sufficient heat and pressure to create polycrystalline diamond material in which adjacent diamond crystals are bonded together; and
- at least one transition layer joined at an interface with the polycrystalline diamond layer and comprising a mixture of diamond crystals and precemented carbide pieces pressed under sufficient heat and pressure to create composite polycrystalline material in which adjacent diamond crystals are bonded together to create polycrystalline diamond material which is bonded to the precemented carbide pieces, and in which transition layer the polycrystalline diamond material and the precemented carbide pieces are interspersed in one another.

* * * * *

UNITED STATES PATENT AND TRADEMARK OFFICE
CERTIFICATE OF CORRECTION

PATENT NO. : 4,729,440
DATED : March 8, 1988
INVENTOR(S) : David R. Hall

It is certified that error appears in the above-identified patent and that said Letters Patent is hereby corrected as shown below:

IN THE BACKGROUND OF THE INVENTION

In column 1, line 42, please delete "relative" and substitute therefor --relatively--.

In column 2, line 5, please delete "The" and substitute therefor --This--.

In column 2, line 12, please delete "with" and substitute therefor --which--.

IN THE BRIEF DESCRIPTION OF THE DRAWINGS

In column 4, line 46 please delete "frustoconically" and substitute therefor --frusto-conically--.

IN THE DETAILED DESCRIPTION OF THE DRAWINGS

In column 5, line 62, please insert --as-- after "such" and before "that".

In column 6, line 11, please delete "place" and substitute therefor --placed--.

In column 6, lines 17 and 18, please delete "cement" and substitute therefor --cermet--.

UNITED STATES PATENT AND TRADEMARK OFFICE
CERTIFICATE OF CORRECTION

PATENT NO. : 4,729,440

DATED : March 8, 1988

INVENTOR(S) : David R. Hall

It is certified that error appears in the above-identified patent and that said Letters Patent is hereby corrected as shown below:

<u>IN THE DETAILED DESCRIPTION OF THE DRAWINGS</u>

In column 6, line 67, please delete "significatly" and substitute therefor --significantly--.

In column 7, line 12, please delete "cobal" and substitute therefor --cobalt--.

In column 7, line 35, please delete "surface" and substitute therefor --surfaces--.

In column 7, line 63, please delete "materal" and substitute therefor --material--.

In column 8, line 48, please delete "has shown" substitute therefor --have showed--.

In column 11, line 54, please delete "shape" and substitute therefor --shaped--.

In column 11, line 58, please delete "of" and substitute therefor --on--.

In column 13, line 45, please delete "is" and substitute therefor --if--.

In column 14, line 33, please delete "wich" and substitute therefor --which--.

UNITED STATES PATENT AND TRADEMARK OFFICE
CERTIFICATE OF CORRECTION

PATENT NO. : 4,729,440

DATED : March 8, 1988

INVENTOR(S) : David R. Hall

It is certified that error appears in the above-identified patent and that said Letters Patent is hereby corrected as shown below:

<u>IN THE DETAILED DESCRIPTION OF THE DRAWINGS</u>

In column 15, line 26, please delete "high" and substitute therefor --higher--.

In column 18, line 8, please delete "similiarly" and substitute therefor --similarly--.

<u>IN THE EXAMPLES</u>

In column 19, line 3, please delete "the".

In column 19, line 18, please delete "The" and substitute therefor --This--.

In column 20, line 19, please delete "265" and substitute therefor --365--.

<u>IN THE CLAIMS</u>

In column 21, line 44, please delete "roler" and substitute therefor --roller--.

UNITED STATES PATENT AND TRADEMARK OFFICE
CERTIFICATE OF CORRECTION

PATENT NO. : 4,729,440
DATED : March 8, 1988
INVENTOR(S) : David R. Hall

It is certified that error appears in the above-identified patent and that said Letters Patent is hereby corrected as shown below:

IN THE CLAIMS

In column 21, line 57, please delete "transistion" and substitute therefor --transition--.

Signed and Sealed this

Twenty-fourth Day of January, 1989

Attest:

DONALD J. QUIGG

Attesting Officer   Commissioner of Patents and Trademarks